United States Patent [19]

Lee

[11] Patent Number: 5,191,494
[45] Date of Patent: Mar. 2, 1993

[54] CASSETTE LOADING APPARATUS IN A VIDEO TAPE RECORDER FOR RECOGNIZING CORRECT TAPE INSERTION USING AN IMPROVED TAPE LID LIFTING APPARATUS

[75] Inventor: Jung-jae Lee, Seoul, Rep. of Korea

[73] Assignee: Samsung Electronics Co., Ltd., Kyunggi-do, Rep. of Korea

[21] Appl. No.: 636,116

[22] Filed: Dec. 31, 1990

[30] Foreign Application Priority Data

Dec. 31, 1989 [KR] Rep. of Korea ............... 89.20724

[51] Int. Cl.[5] .................................... G11B 15/675
[52] U.S. Cl. .............................................. 360/96.5
[58] Field of Search ............... 360/96.5, 85; 242/198, 242/199

[56] References Cited

U.S. PATENT DOCUMENTS 4,484,240 11/1984 Yoshida ........................... 360/96.5

Primary Examiner—Robert S. Tupper
Attorney, Agent, or Firm—Cushman, Darby & Cushman

[57] ABSTRACT

An improved cassette loading apparatus for a video cassette recorder using a VHS type video tape cassette which includes a driving mechanism. The apparatus comprises improved lever type cassette recognition means and lid opening means rotatably mounted to a cassette holder for receiving the cassette. As a result, the present invention doesn't cause failure of cassette loading operation due to wrong cassette insertion and related problems including an increase in motor head.

1 Claim, 5 Drawing Sheets

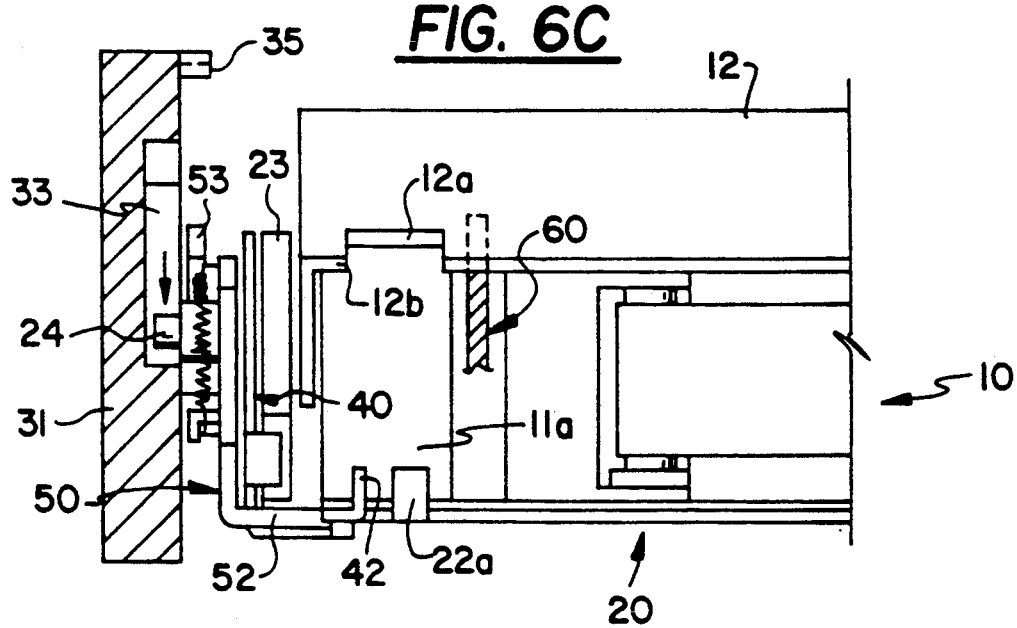

CASSETTE LOADING APPARATUS IN A VIDEO TAPE RECORDER FOR RECOGNIZING CORRECT TAPE INSERTION USING AN IMPROVED TAPE LID LIFTING APPARATUS

FIELD OF THE INVENTION

The present invention relates to a cassette loading apparatus for a front loading type video cassette recorder (hereinafter referred to as "VCR") using a VHS type video tape. More particularly, the present invention is directed to a cassette loading apparatus having improved means for recognizing the correct insertion of an appropriate cassette, and means for opening a front lid of the cassette during a loading operation.

BACKGROUND OF THE INVENTION

A VHS type cassette is constructed in fully closed structure having a lid provided in front of it where its tape is exposed. Here, the lid is installed with a lock mechanism and is supposed to be open in case the lock mechanism is released.

A front loading type cassette loading apparatus generally comprises a driving mechanism, a cassette holder for receiving an inserted cassette, means for moving the inserted cassette horizontally at a constant level and then moving it vertically downward by the driving mechanism and a cassette holder housing for guiding the horizontal and vertical movements. The cassette holder is provided with a release lever for releasing the lock mechanism of the cassette lid.

Therefore, a cassette should be correctly inserted into the cassette holder and its lock mechanism and release lever must meet exactly such that the lid opening operation is smoothly carried out. In other words, cassette recognition means is needed for stopping the cassette holder in case a cassette is inserted incorrectly. Such cassette recognition means plays a very important role when a cassette holder is automatically transferred by a motor, and turned on by a user's pushing of the cassette regardless of an absence or a mislocation of the cassette due to initial back tension.

Therefore, a conventional system, comprises a lifter mechanism which is elastically biased upward on the side of the cassette holder. The lifter holds the cassette holder by engaging with a fixture located over the cassette holder, for example a housing of the cassette holder, and releases the holder to be transferred by the weight of the inserted cassette. The lifter, however, cannot be operated well when the cassette sways vertically.

Conventional cassette lid opening means comprise a cam groove formed in a guide bracket which guides the movement of the cassette holder, and a lid opener installed on the cam groove with a spring and displaced by the pushing of the cassette holder. However, the lid opener easily departs from the cam groove and the spring gives a resistant force in the opposite direction of moving of the cassette holder motion to increase the load of a driving motor.

SUMMARY OF THE INVENTION

Therefore, it is the object of the present invention to provide a cassette loading apparatus free of any false operation or trouble by adapting lever type cassette recognition and cassette lid opening means.

In achieving the above object, a cassette loading apparatus for loading or unloading a cassette to a video cassette recorder having a driving mechanism for the apparatus, comprises:

a cassette holder for receiving the cassette and being driven by the driving mechanism;

a cassette holder housing having two guide brackets at each side of the housing which guides the holder horizontally and vertically;

a top plate mounted to the two brackets, a protrusion cam formed on one of the brackets, and an engaging groove formed on the top plate;

a cassette recognition lever installed at one side of the holder, and having a part for contacting with a front part of the cassette and a hooking part for engaging with the engaging groove of the top plate, the lever is rotated by the contact part pushed by an insertion of the cassette to make the hooking part depart from the engaging groove; and a lid opening lever installed at the side of the holder, and having a lid supporting part for lifting the lid and a cam contact part located at a level for engaging with the protrusion cam of the guide bracket, the lever is rotated by the cam contact part pushed by a movement of the cassette holder to lift the lid supporting part.

The present invention is further characterized in that the cassette recognition lever and the lid opening lever are rotatably mounted to a same axis respectively.

BRIEF DESCRIPTION OF THE DRAWINGS

Other objects and features of the present invention will be more apparent from the following detailed descriptions with reference to the accompanying drawings, in which:

FIG. 6C is a front elevation for the same state as FIG. 5.

DETAILED DESCRIPTION

Figure 1:
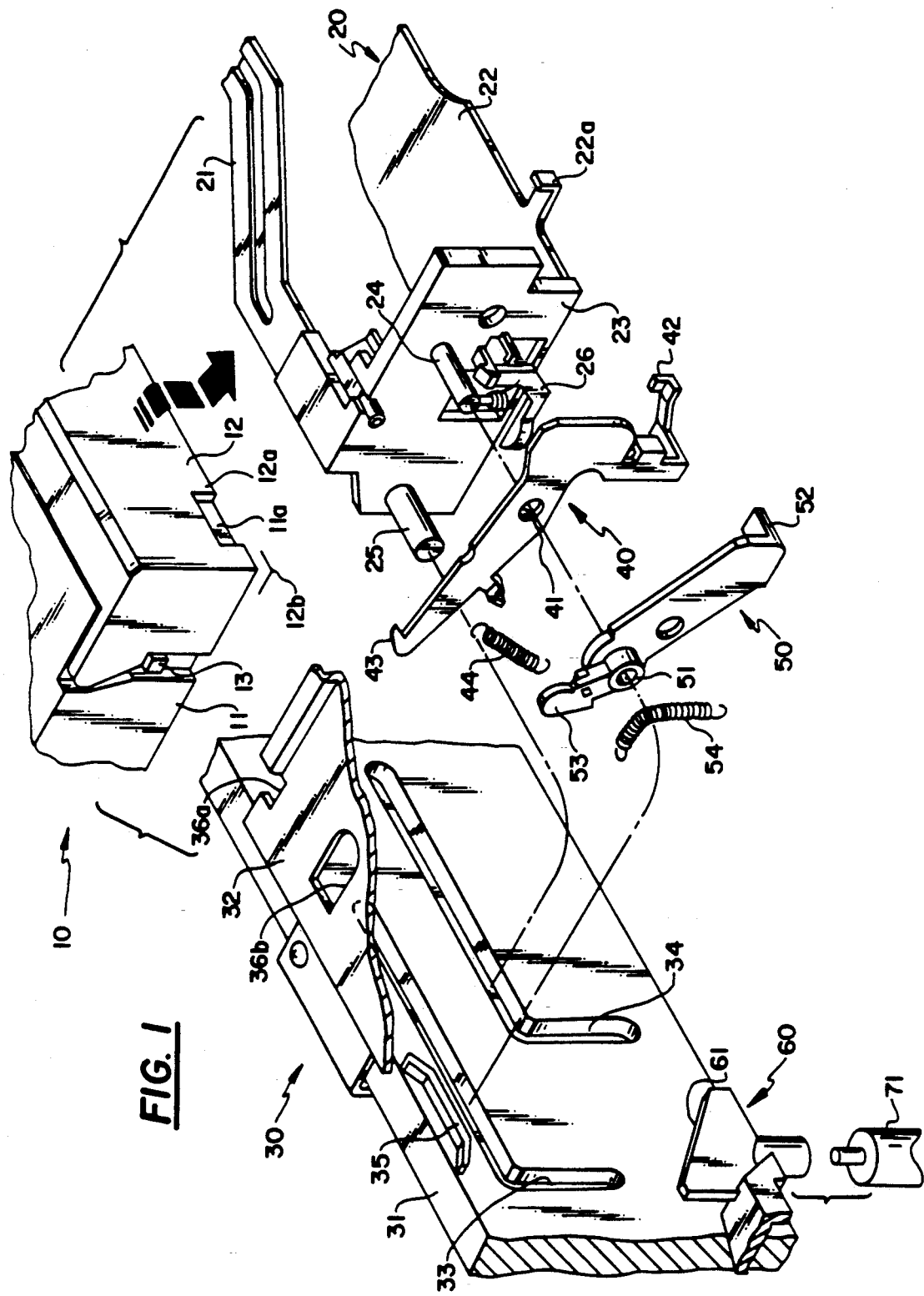
FIG. 1 is an exploded perspective view showing the structure of a cassette loading apparatus according to the present invention.

In a cassette loading apparatus according to the present invention shown in FIG. 1, numeral 10 indicates a cassette, 20 a cassette holder, 30 a cassette holder housing, 40 a cassette recognition lever and 50 a lid opening lever, respectively.

The cassette 10 is preferably a VHS type cassette having a main body 11, an openable lid 12 rotatably mounted to one side of the body 11 and a release button 13 for releasing a lock mechanism (not shown) of the lid 12. The lid 12 has a recess 12a indented from the lower end to expose a part 11a of the bottom of the body 11. The lid can be opened to expose a tape 14 (see FIG. 6B and 6C)

The cassette holder 20 consists of a upper plate 21, a lower plate 22 and side plates 23 (only one side is shown in the drawing). On each of the side plates, guide bosses 24, 25 which protrude aside and release spring lever 26 which passes the release button 13 of the cassette 10, are installed. On the lower plate 22, a stopper 22a is provided for preventing over-inserting of the cassette 10 by engaging with a part 11a of the cassette. Therefore, the cassette 10 is inserted into the cassette holder 20 until a part 11a of it engages with the stopper 22a and then, the release button 13 of the cassette 10 is pressed by the release lever 26.

A cassette holder housing 30 consists of guide brackets 31 (only one side is shown in the drawing) respectively opposed to the side plates 23 of the cassette holder 20, and a top plate 32 secured to the upper ends of the brackets. In the guide brackets 31, two right-angled guide grooves 33,34 where the guide bosses 24,25 of the cassette holder 20 are slidingly engaged and a protrusion cam 35 on the inner side thereof, are respectively formed.

The cassette recognition lever 40 consists of a supporting hole 41 where the guide boss 24 is inserted to allow the lever to be rotated with respect to the guide boss 24 of the cassette holder 20; a contact part 42 located on the side and on the front of the stopper 22a of the cassette holder 20 so as to be pushed by the front part 11a of the cassette 10; and a hooking part 43 to engage with the engaging groove 36a or 36b of the top plate 32. The lever is elastically biased to lift the hooking part 43 by a spring 44.

The lid opening lever 50 consists of a hollow boss 51 where the guide boss 24 is inserted to allow the lever to be rotated with respect to the guide boss 24 of the cassette holder 20; a lid supporting part 52 which supports one lower corner 12b of the lid 12 so as to lift the lid 12 of the cassette 10; and a cam contact part 53 at the height to be pressed by the protrusion cam 35 of the guide bracket 31. A spring 54 elastically biases the lever in the direction that the cam contact part 53 is lifted.

Figure 2:
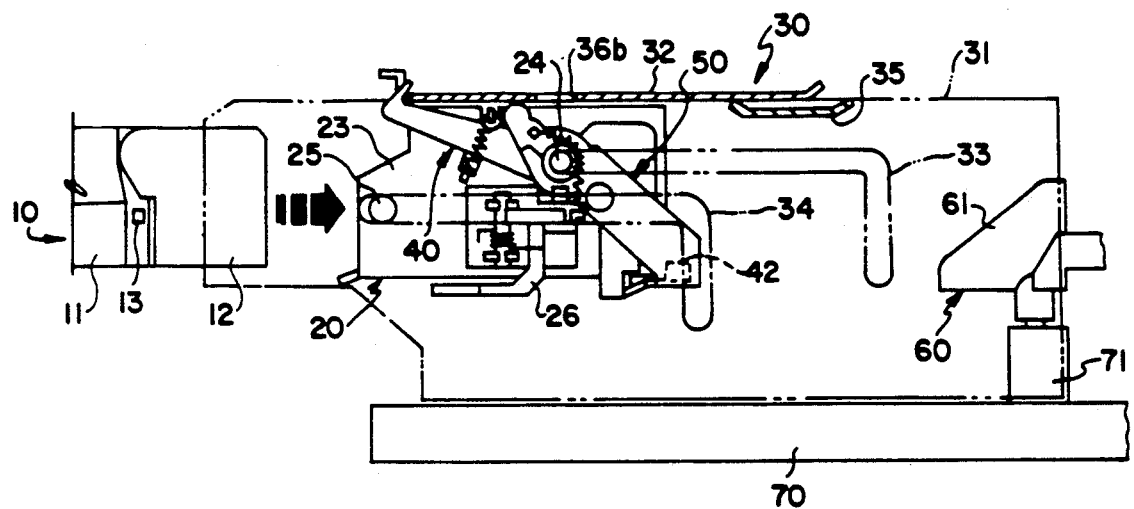
FIG. 2 is a side elevation showing a state before inserting a cassette into the cassette holder shown in FIG. 1.
Figure 5:
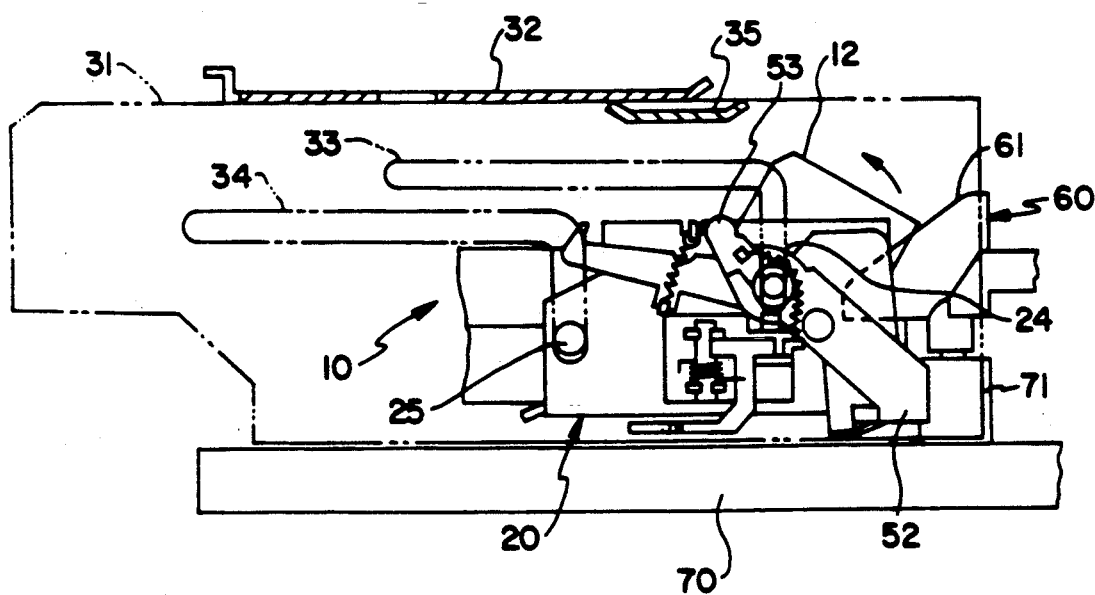
FIG. 5 is a side elevation showing a state that the cassette holder is loaded after vertically moving downward from FIG. 4.

Numeral 60 is an additional cam which has an inclined part 61 to be directed to the bottom of the cassette 10 and functions to completely open the lid 12 of the cassette 10, being installed in a supporting boss 71 on a deck 70 as shown in FIG. 2 or FIG. 5.

Also, in the above apparatus, a driving mechanism (not shown) is installed, which is mounted on the guide bracket 31 and drives the guide bosses 24,25 to be moved horizontally and vertically along the right-angled guide grooves 33,34 of the guide bracket 31, while drivingly engaging with one of the guide bosses 24,25. The detail of a driving mechanism is described in U.S. Pat. No. 4,685,009, as one example.

Operation of the preferred embodiment of the present invention is shown in FIG. 2 to FIG. 5.

A first state before inserting a cassette 10 will be described with respect to FIG. 2. The guide bosses 24,25 of the side pates 23 of the cassette holder 20 are respectively positioned at starting points of the horizontal regions of the right angled grooves 33 of the guide brackets. The hooking part 43 of the cassette recognition lever 40 is engaged with the engaging groove 36a of the top plate, thereby making the cassette holder not movable.

Figure 3:
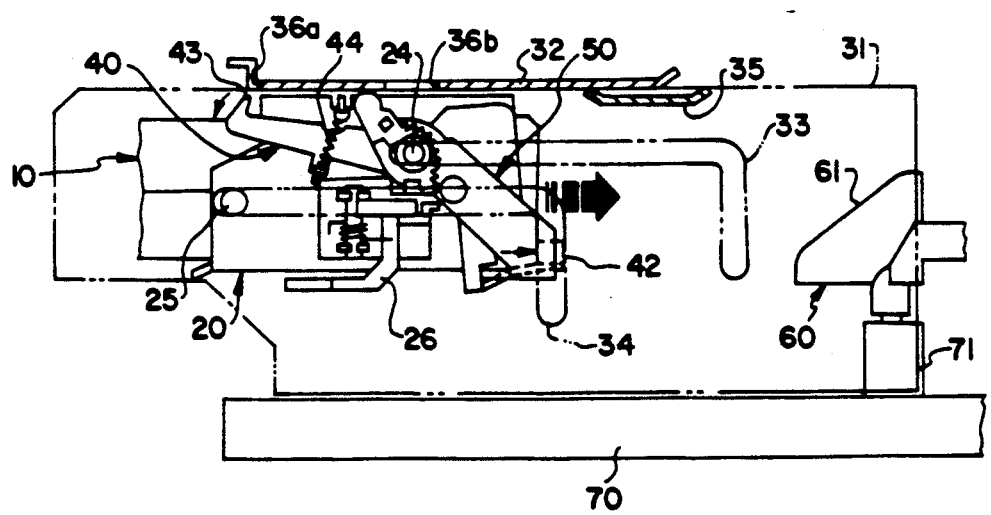
FIG. 3 is a side elevation showing a state after inserting a cassette into the cassette holder shown in FIG. 1.
Figure 6A:
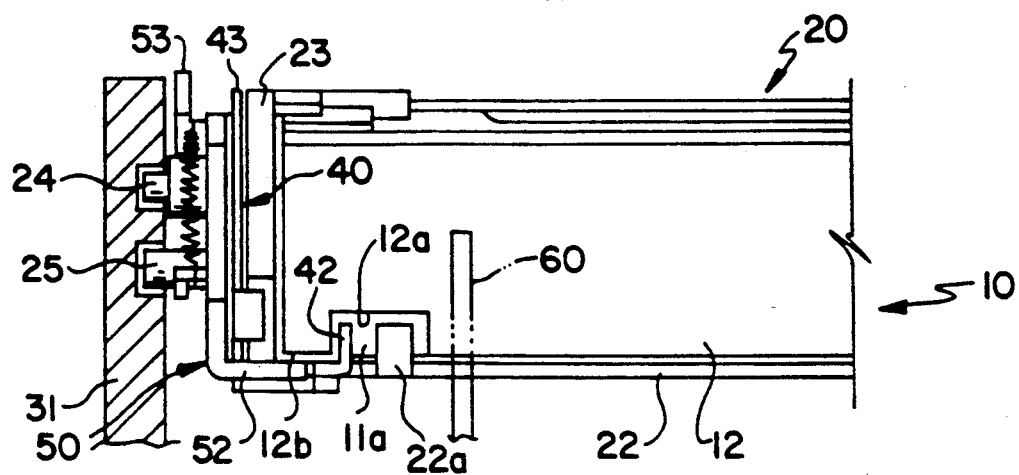
FIG. 6A is a front elevation for the same state as FIG. 3.

As shown in FIG. 3 and FIG. 6A, if the cassette 10 is inserted into the cassette holder 20 until the front part 11a of it contacts with the stopper 22a, then the contact part 42 of the cassette recognition lever 40 is pushed forward by the front part 11a. Accordingly, the lever is rotated to uncouple the hooking part 43 from the engaging groove 36a of the top plate 32. Therefore, the cassette holder 20 can move horizontally with the cassette 10. At this time, as a release button 13 of the cassette 10 is pressed by a release lever 26 of the cassette holder 20, the lid becomes openable. One lower corner 12b of the lid 12 is lightly contacted with the lid supporting part 52 of a lid opening lever 50. If the cassette is not inserted properly, or the cassette is uncoupled from the holder due to back tension sometime after the initiation of the horizontal movement, the cassette recognition lever 40 is restored by a spring 44. Accordingly, the cassette holder 20 is stopped as its hooking part 43 will engage with the engaging grooves 36a,36b of the top plate 32. In this case, its movement can be resumed when a user inserts the cassette 10 properly again.

Figure 4:
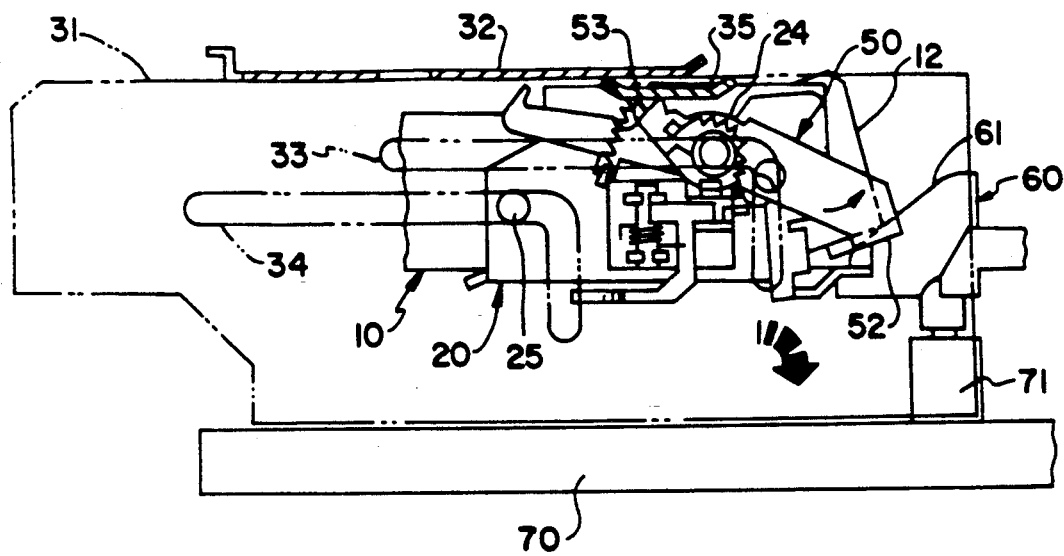
FIG. 4 is a side elevation showing a state that the cassette holder shown in FIG. 3 moves horizontally.
Figure 6B:
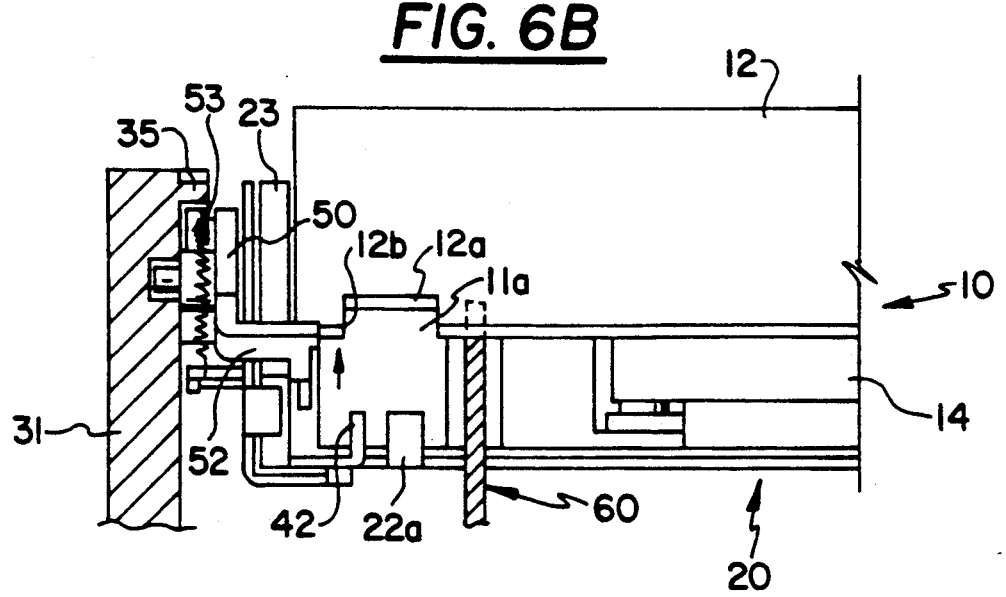
FIG. 6B is a front elevation showing the same state as FIG. 4.

FIG. 4 and FIG. 6B show a state where guide bosses 24,25 of the cassette holder 20 reach the end of the horizontal movement of the guide grooves 33, 34 of the guide bracket 31. In the drawings, the lid opening lever 50 is rotated when engaging of the cam contact part 53 with the protrusion cam 35 of the guide bracket 31, and thus the lid 12 of the cassette 10 is opened by the lid supporting part 52 and lightly contacts the inclined part 61 of the additional cam 60. At this time, tape 14 of the cassette 10 is half-exposed.

As shown in FIG. 5 and FIG. 6C, when the cassette 10 and the cassette holder 20 are moved downward by, the lid opening lever 50 departs from the protrusion cam 35 to return to its initial position. Meanwhile, the cassette 10 is loaded on the deck 70 with its tape 14 fully exposed as the lid 12 is completely opened by the additional cam 60.

Until now, the above description has been given in connection with a cassette loading operation. The unloading operation can be executed in reverse order.

As described above, the present invention provides an improved cassette loading apparatus having lever type cassette recognition and lid opening means. According to the present invention, faulty operation due to vertical sway of a cassette, a decoupling of the lid opening lever, increase of a motor load can be avoided and reliable operation can be assured. Thus, the present invention contributes to improving the quality of a VCR system.

While a preferred embodiment has been described using specific terms, such description is for illustrative purposes only, and it is to be understood that changes and variations can be made without departing from the spirit or scope of the following claim.

What is claimed is:

1. A cassette loading apparatus for loading and unloading a cassette having a front lid attachment from a video cassette recorder which includes a driving mechanism for said apparatus, comprising:

a cassette holder for receiving the cassette during an operator loading operation, said cassette holder being mechanically driven by said driving mechanism and including outwardly protruding coupling means;

cassette holder housing means comprising:

first and second side brackets respectively coupled to opposing sides of said cassette holder via the outwardly protruding coupling means, each side bracket including guide means for supporting said outwardly protruding means and for guiding said cassette holder in a horizontal and vertical direction along a fixed axis, said fixed axis being related to an insertion angle of the cassette;

a top plate mounted to said first and second side brackets and including an engaging groove formed thereon; and a protruding cam formed on a surface of at least one of said side brackets facing said cassette holder;

a cassette recognition lever coupled to said cassette holder and to said at least one side bracket so as to rotate along said fixed axis, and comprising hooking means for latching onto said engaging groove formed on said top plate, wherein said hooking means is disengaged from engaging groove when a properly inserted cassette causes said cassette recognition lever to rotate in response to the insertion of the cassette in said cassette holder; and a lid opening lever coupled to said cassette holder and said at least one side bracket so as to rotate along said fixed axis, comprising:

lid supporting means for lifting the front lid attachment of a cassette already inserted into the cassette holder; and cam contact means coupled to said protruding cam for causing said lid opening lever to rotate in response to the cassette holder being guided along said guide means.

* * * * *